July 16, 1935.  J. CATARAU  2,008,004

ARTIFICIAL BAIT

Filed Sept. 10, 1934

Jules Catarau

INVENTOR

Patented July 16, 1935

2,008,004

UNITED STATES PATENT OFFICE 2,008,004

ARTIFICIAL BAIT

Jules Catarau, Seattle, Wash.

Application September 10, 1934, Serial No. 743,403

2 Claims. (Cl. 43—46)

This invention relates to artificial bait, known as plug, squid, jigger, etc., and resides in the novel construction on said baits of a scent oozing means.

The main object of the invention is to provide said scent oozing means on any lure-body of an artificial bait without marring the attractive optical effect of the same.

A further aim is to construct said means so that the same may be simple in operation and inexpensive in manufacture.

In the herewith annexed drawing the

A lure-body 6 has on its surface intermediate its ends a recess 7 which is provided with a plate-member 8, said plate-member preferably being hinged at 9 to the lure-body to fit over the recess 7 and enclose a scent material between its inner surface and the recessed surface 7 of the lure-body.

Figure 1:
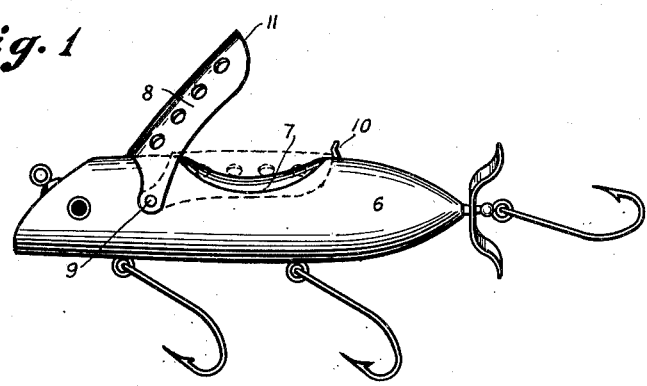
Figure 1 illustrates a lure-body provided with scent oozing means in accordance with this invention.
Figure 4:
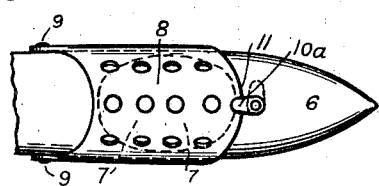
Figure 4 is a top view of Figure 2, and illustrates an alternate form of fastening means 10a that may be used in this device without departure from the spirit of the invention.

As means to hold said plate-member over the recess a springy extension 10 as in Figure 1, or a sidewisely articulated click 10a of Figure 4, is provided on the lure-body, to clamp over the edge 11 of the plate-member and retain the same in closed position over the scent material placed in the recess 7.

Figure 2:
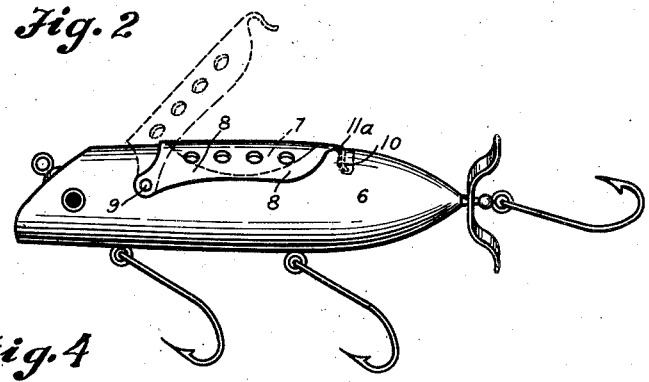
Figure 2 illustrates a modified form of fastening means shown in Figure 1.
Figure 3:
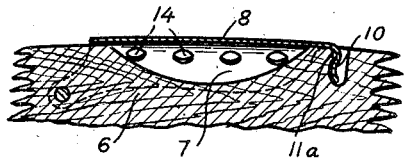
Figure 3 is a fragmentary longitudinal section of Figure 2.

Said extension 10, or the like, may be an extension of the plate-member, as illustrated in Figures 2 and 3, and adapted to clasp over the edge 11a formed on the surface of the lure-body.

This device offers quick access to the bait receptacle formed by the recessed portion 7 and the plate-member 8.

A plurality of openings 14 are made through the wall of said plate-member to permit water to circulate in and out and to mix its molecules with emanations of the scent material and create around the lure-body an effluvium.

Figure 5:
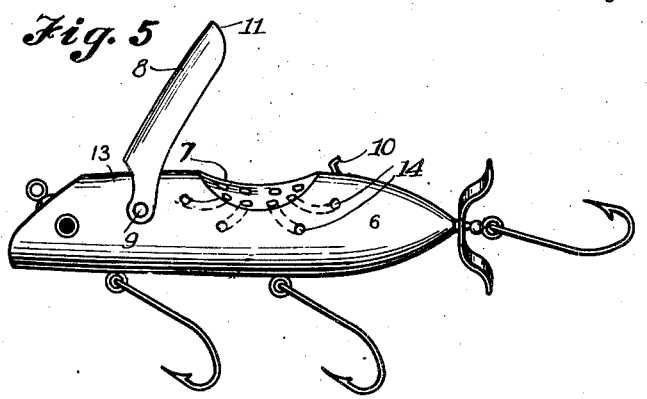
Figure 5 illustrates an alternate form of the scent oozing means 14.

Said plurality of openings 14 may be dispensed with if the lure-body carries similar openings leading in and out for the same purpose as stated hereinbefore as illustrated in Fig. 5.

What I claim as my invention is:

1. A lure-body having intermediate its ends a recessed portion to receive a scent material, a plate-member hinged to said lure-body to fit over said recessed portion, and an extension, or the like, formed on said lure-body and adapted to clamp over the edge of said plate-member and retain the same over the scent material.

2. A lure-body having intermediate its ends a recessed portion to receive a scent material, a plate-member hinged to said lure-body to fit over the recessed portion, and a sidewardly articulated click mounted on the lure-body to switch over the edge of the plate-member and retain the same over the scent material.

JULES CATARAU.